March 6, 1945. G. A. JEFFREYS 2,370,665
BIOCHEMICAL PROCESS AND APPARATUS FOR MANUFACTURING FOOD PRODUCTS
Filed Aug. 21, 1940
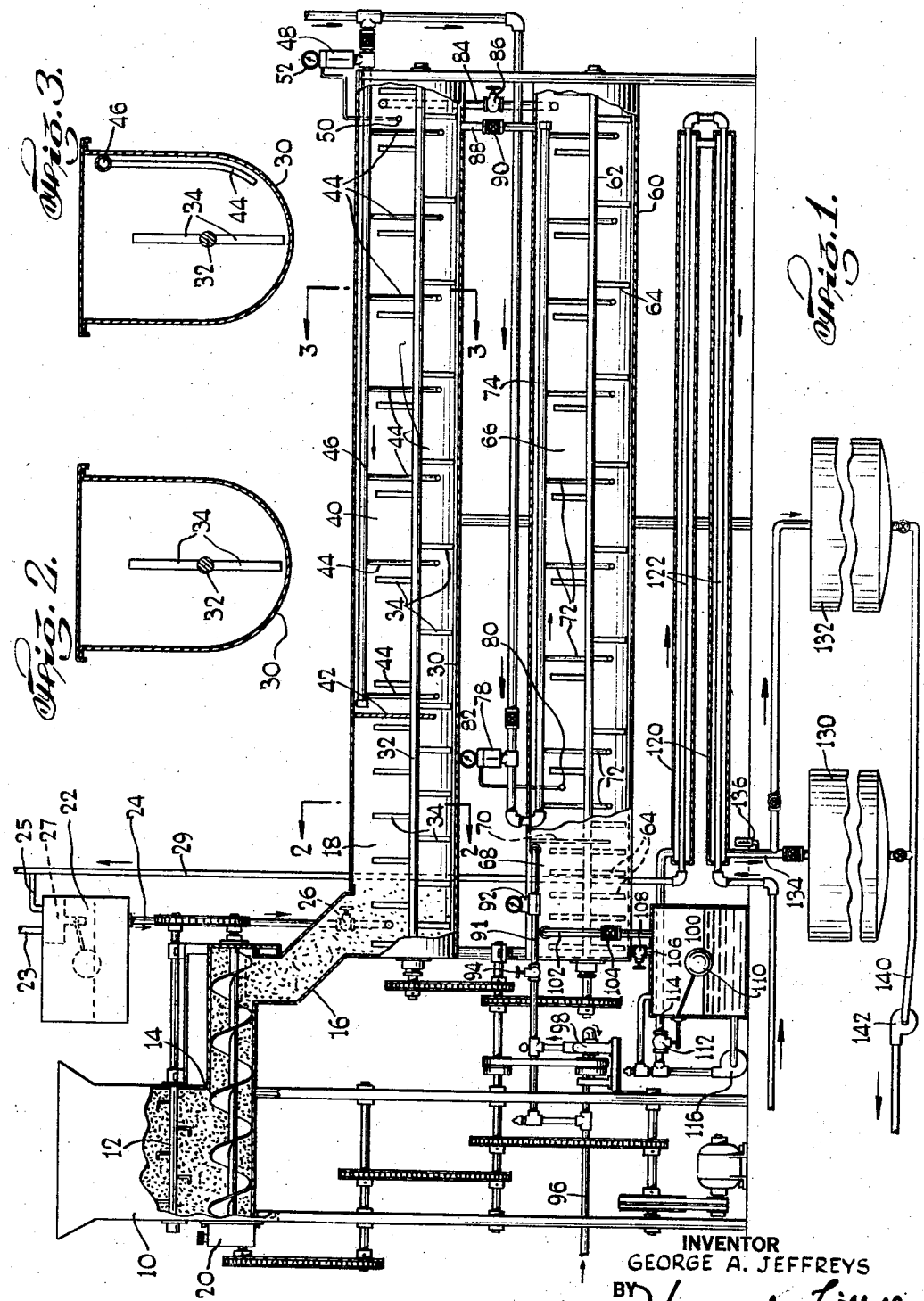
INVENTOR
GEORGE A. JEFFREYS
BY
ATTORNEY Patented Mar. 6, 1945

2,370,665

UNITED STATES PATENT OFFICE 2,370,665

BIOCHEMICAL PROCESS AND APPARATUS FOR MANUFACTURING FOOD PRODUCTS

George A. Jeffreys, Calcium, N. Y., assignor, by direct and mesne assignments, to Nelson Littell, New Canaan, Conn.

Application August 21, 1940, Serial No. 353,471

21 Claims. (Cl. 99—9)

This invention relates to new and improved biochemical processes and apparatus for use in the manufacture of special food products from inexpensive raw materials, and particularly to improvements in or relating to the manner of practicing the invention disclosed and claimed in my United States Letters Patent No. 2,095,638.

The invention of said Letters Patent has provided a new type of liquid base material for food products, and new composite food products made therewith, in which special physical properties and beneficial food constituents have been developed by a succession of treatments of a starting material composed largely of cereal starch. The liquid base material resulting from the treatments is characterized by a syrupy liquid consistency and by the presence of simple sugars, disaccharides, yeast, vitamin $B_1$, vitamin G, enzymes, lactic acid, and lactic acid organisms, all in comparatively high concentrations. By combining this material with solid food in the form of a meal or mash, valuable composite food products are obtained which possess the beneficial constituents of the liquid base and in which such constituents may be extended by the action of the base material. The physical qualities of the liquid base material render it advantageous for use as an adhesive binder when forming various types of solid feeds or meals into kernels, granules, pellets, cakes or other special shapes by means of pelleting or molding machines.

Heretofore the liquid base material has usually been manufactured substantially in accordance with the embodiment described in said Letters Patent No. 2,095,638. A batch of starting material containing cereal starch, powdered milk, sugar or molasses and water is mixed in a vat and then boiled until the starch has disrupted and become gelatinized. At this stage the material has a pasty, non-flowing consistency. It is then cooled to about 35° C. and afterward is treated with diastatic enzymes, inoculated with yeast rich in vitamin $B_1$ and allowed to ferment for about 8 to 12 hours. These steps convert sucrose into invert sugar and hydrolyze the gelatinized starch. They also increase the yeast and vitamin contents of the material. The batch is then enriched with molasses or sugar, then inoculated with lactic acid bacilli and then cultured for 12 to 16 hours, after which treatments the material has changed in physical form from a paste to a syrupy liquid and has become ready for use as a constituent or binder of the new composite food products.

Each step of this previous embodiment involves the handling and separate treatment of batches of material in vats. As a consequence the procedure is burdensome and unduly expensive, and difficulty is encountered in maintaining the desired uniform control over the conditions and results of the treatments. The system becomes quite burdensome when it is necessary for a single plant to produce several thousand gallons of the liquid base material per day. Prior to the present invention, however, the treatments deemed necessary for the practice of the process and the qualities of the materials at various stages in the course of manufacture precluded the adoption of any other system of a more economical or more practical nature. For example, gelatinization of the starch content of the starting material and the subsequent cooling of the gelatinized material to a comparatively low temperature have been carried out as steps separate and distinct from the later conversion of the starch by the action of diastatic enzymes, because the heating temperatures and the period of heating required for the gelatinization have been such that the diastatic enzymes, if present at that stage, would be destroyed before acting on the gelatinized starch.

Among the objects of my present invention are to provide a new and useful process and new apparatus therefor by which the aforesaid food making method and other biochemical processes using starch as a principal raw material can be carried out with greater economy and efficiency than heretofore; with greater speed for a given output of product, thereby increasing the producing capacity of a plant of given size; with the production of more concentrated products; and with more efficient and more uniform control over process operations, which reduces operating costs and otherwise increases the efficiency of manufacture.

Another object of this invention is to provide improvements in the manufacture of food products or the like from starches which enable the gelatinization of the starch and the conversion of the gelatinized starch by the action of enzymes to be carried out in a continuous manner, while maintaining the materials concentrated yet in a liquid and flowable state as distinguished from the usual pasty or non-flowing state of concentrated starch materials after disruption or gelatinization according to known methods.

I have found it possible to produce a concentrated liquid base as described, composed largely of sugars produced from starch and containing substantial concentrations of vitamin $B_1$, vitamin G, enzymes, yeast, lactic acid and lactic acid organisms, by adapting the process of manufacture to special characteristics of the diastatic enzymes and of certain starches, by carrying out the gelatinization and the conversion of the starch almost simultaneously in the presence of the enzymes and of agents which accelerate starch hydrolysis, and by maintaining special control over the temperatures and time of heating by which to effect the starch gelatinization and conversion. In the practice of this invention, the starch component of the starting mixture is disrupted and gelatinized and then hydrolyzed and rendered liquid immediately upon gelatinization, so that it becomes possible to use a more concentrated starting mixture than heretofore yet to keep the material in liquid form. This almost simultaneous gelatinization, liquefaction and conversion of the starch also allows the treatments to be carried out by means of a new continuous process and new apparatus having important economies and other advantages over prior practice. In addition, it permits further steps in the production of the desired final product to be carried out in an advantageous manner.

I have found that some starches, when mixed with water and heated, are disrupted and gelatinized at lower temperatures than others. For instance, wheat starch disrupts at about 62° C., corn starch at about 70° C., and potato starch at about 96° C. When the starch cells are disrupted, a colloidal dispersion or gelatinization with water follows, and at this point a concentrated material would become pasty if treated according to previous methods.

I have also found that the conversion of starch into sugars by the action of diastatic enzymes can be greatly hastened by carrying out the conversion in the presence of accelerating agents or catalysts. Amino acids contained in milk, casein, soy bean meal and the like have been found effective as such starch-hydrolysis accelerating agents. Instead of soy bean meal or the like various other protein compounds yielding similar amino compounds may be used, or inorganic nitrogenous compounds such as ammonium sulfate, ammonium phosphate and the like.

I have further that the thermal inactivation point of diastatic enzymes varies inversely with the time of exposure of the enzymes to any given temperature; for instance, malt amylase in a plain salt solution is destroyed in one hour at 60° C. and in only a few minutes at 70° C.

In accordance with the present invention, therefore, I take into consideration and utilize the qualities of starches which disrupt at comparatively low temperatures, the thermal inactivation qualities of diastatic enzymes and the action of starch-hydrolysis acceleration agents such as amino acids contained in milk, soy bean meal and the like, and I begin the operation of my improved process with a starting material composed largely of starch having a low-cell disruption temperature in admixture with diastatic enzymes and such accelerating agents. This material is combined with water to form a concentrated mixture, and the resulting mixture is then heated to such temperatures above the disruption temperature of the starch and for such a period of time that most of the starch becomes disrupted, gelatinized and converted into sugars before substantial inactivation of the diastatic enzymes takes place. Under these conditions, the enzymes in the presence of the starch-hydrolysis accelerating agent convert the gelatinized starch into dextrine, maltose and then dextrose immediately upon gelatinization of the starch, and the mass of material is kept liquid and prevented from assuming a pasty or non-flowing consistency.

With the use of these features, it becomes possible to carry out the manufacture of food products from starches in a new and advantageous manner. For example, the manufacture of my special liquid base for food products may be started with a mixture of wheat starch, 7 to 9% of malt flour made from barley malt (or an equivalent amount of diastatic enzymes from other sources, such as Asp. oryzae), 5 to 20% of powdered milk, and/or 5 to 15% of soy bean meal. By combining this mixture with about 1 to 2 times as much water, by weight, gelatinization, liquefaction and conversion of the starch in the mixture may be accomplished in about seven minutes while progressively increasing the temperature of the mixture from about 60° to about 80° C. By the time the starch has been hydrolyzed and the final temperature of about 80° C. or higher has been reached, the thermal inactivation point of the enzymes is attained and the enzymes automatically become dormant, or in some cases destroyed, although the constituents of the liquefied material have been found to act as buffers which tend to protect the enzymes against permanent inactivation, or destruction. The final temperature in any event renders the liquefied material sterile and fits it for use in subsequent culturing steps.

Under such conditions, the initial dry ingredients and water may be supplied and mixed together continuously, and the resulting mixture may then be passed through a special mixing, conveying and heating apparatus of practical size in which the gelatinization, liquefaction and conversion take place continuously and from which is continuously obtained a large output of a liquid intermediate product composed largely of dextrose. This product may be continuously enriched, in the same apparatus, with sucrose-bearing material such as molasses, and the enriched material may then be cooled continuously to reduce its temperature to a desired range before batches of it are collected in culturing tanks where fermentations with yeast and lactic acid organisms take place. After these fermentations, the material has become a liquid base material of the character hereinabove described.

The new apparatus provided for the practice of my invention, according to a preferred embodiment, includes a mixing bin for holding dry starting ingredients, a supply tank for make-up water, mixing trough means for mixing together continuous streams of the starting ingredients and water and for heating the resulting mixture, and means for feeding the starting ingredients and the water at regulated rates into and through the mixing trough. The mixing trough means may include a series of sections, with the first section a simple stirring and mixing section, the second section a preheating section equipped with suitable heating means and a third section also equipped with heating means so as to effect the gelatinization, liquefaction and conversion of the starch ingredients. The heating of the mixture in the second and third trough sections may be carried out in various ways, as by injecting steam thereinto from steam fingers projecting into the trough, and temperature regulators may be provided near the ends of the respective sections to govern the heat supply in accordance with the temperature of the mixture and thus prevent the mixture from exceeding the temperatures desired for proper treatment. The mixture issues from this treating system with most of the starch completely hydrolyzed and in liquid form. To effect further preparation thereof for the production of a liquid base as hereinbefore described, the liquefied material from the third mixing trough section may be discharged into a fourth section where molasses, cane or beet sugar, or other sucrose-bearing material is added at a regular rate to enrich the liquid. The enriched liquid may then pass continuously from this fourth section into a constant-level holding tank, and from the latter it may be pumped through a cooling coil so that the cooled material will leave the coil at a temperature suited for subsequent treatments and fermentations thereof with yeast and lactic acid bacilli. These subsequent treatments may be carried out advantageously in batches, although the culturing tanks used for the purpose can be employed in timed coordination with the continuous operation of the other apparatus.

Other new features and advantages of my improved process and apparatus will become apparent from the following detailed description of an illustrative embodiment. The following description refers to the illustrations on the accompanying drawing, forming a part hereof, in which Figure 1 is a schematic vertical, longitudinal cross section, showing one embodiment of apparatus which may be used for the practice of my improved process, and Figures 2 and 3, respectively, are transverse cross-sections along lines 2—2 and 3—3 of Figure 1.

Referring to the drawing for details of the illustrated embodiment, a hopper 10 is provided for holding a mixture of substantially dry starting ingredients, the hopper having agitating or stirring means 12 therein and having at its bottom a percentage feeder 14 in the form of a screw conveyor or the like. The feeder 14 delivers material from the hopper into a chute 16 leading into the first or mixing section 18 of a mixing trough 30. The rate of feed of material from the hopper into the mixing section 18 may be controlled by regulating the rate of rotation of the feeder 14, as at 20.

A water supply tank 22 is provided above the mixing section 18 and connected with the latter by means of a pipe 24, controlled by a valve 26. Water may be introduced into tank 22 from a pipe 23. If this water should be too cold for efficient operation of the process, it may be tempered by mixture with warm water from a pipe 25, the proportions of cold and warm water being regulated by a mixing device 27. Warm water introduced through 25 may be derived from an overflow pipe 29 connected with a heat exchange or cooling system 120, 122, hereinafter to be described.

It will be understood that water from tank 22 may be introduced into 18 at a regulated rate through pipe 24, and that solid starting ingredients may be introduced into 18 at a regulated rate through the chute 16.

The mixing section 18 is defined by part of an elongated trough 30 through which extends a shaft 32 carrying stirring or mixing paddles 34 thereon. The paddles 34 are set on the shaft 32 at such a pitch that a mixing action will be obtained therefrom when the shaft is rotated, as well as a slight conveying action lengthwise of the trough 30. For example, the paddles 34 may be spaced apart a distance of about 6 to 10 inches.

The mixing section 18 is partially separated from a second trough section 40 by means of a partition or baffle 42, beneath which the mixture must pass in travelling from 18 into 40. This baffle prevents floating lumps from passing into the second section 40 without having been broken up by the action of the paddles 34 in the mixing section 18.

The paddles 34 in the second section 40 provide a less violent action than those in the mixing section 18, and toward the right-hand end of section 40 they preferably are arranged so as to impart only a stirring and very slight conveying action.

In addition to this mixing and conveying means, the second trough section 40 is provided with heating means for progressively increasing the temperature of the mixture passing therethrough. The heating means, for example, comprises a plurality of steam fingers 44 which open into the lower portion of the trough and are connected with a common steam header or supply pipe 46. The steam fingers 44, for example, may be arranged about 8 to 10 inches apart between paddles 34. Connected with the steam supply pipe 46 is a temperature regulator 48 having a bulb 50 located near the end of the trough section 40 in position to respond to the temperature of the mixture at that point, and having a gauge 52 thereon to indicate the temperature at that point. The temperature regulator 48 may be of any well known type and therefore has not been illustrated in detail. It is sufficient to point out that the regulator may be set to regulate the temperature of the mixture at the end of trough section 40, so that when the mixture tends to exceed a predetermined temperature the amount of steam introduced through the steam fingers 44 is decreased accordingly.

From the foregoing, it will be apparent that the solid ingredients and water introduced into the mixing section 18 from chute 16 and pipe 24, respectively, are stirred and mixed together in section 18 and pass from the latter into section 40 beneath the partition or baffle 42. In section 40, the mixture is agitated by the paddles 34 and progressively heated to a predetermined temperature by the introduction of steam through the steam fingers 44. In the preferred embodiment of my invention, this second trough section 40 is employed as a preheating section, and the temperature regulator 48 is set so as to cause the mixture to be heated to a temperature approximating the disruption temperature of the starch by the time the mixture has reached the end of trough section 40.

As shown in Figure 1, another mixing trough 60 is provided for completing the starch conversion phase of the process. This trough may be, for example, about 25% larger than trough 30, so as to accommodate the addition of molasses to the mixture as hereinafter described. Trough 60 is shown as being located below trough 30, but it will be apparent that other arrangements, such as a continuous straight-line system, may be employed. A shaft 62 extends longitudinally through trough 60 and is equipped with radial paddles 64 which agitate the material in trough 60 and impart a conveying action thereto in the direction of the trough end; that is to say, from the right-hand to the left-hand end of trough 60 as seen in Figure 1. The paddles 64 in most of trough 60 may be arranged, for example, about 6 to 10 inches apart. As seen in Figure 1, however, trough 60 is divided into two sections 66 and 68, respectively, by means of a baffle or partition 70, and the paddles 64 in section 68 are preferably arranged more closely together so as to provide a greater degree of agitation in section 68. Section 66, like the preceding section 40, is provided with a plurality of steam fingers 72 which extend into the bottom part of the trough from a common steam header or supply pipe 74. A temperature regulator 78, similar to regulator 48, is connected with the supply pipe 74 and provided with a bulb 80 positioned so as to respond to the temperature of the mixture near the end of trough section 66. A gauge 82 indicates the temperature of the mixture at this point.

Material reaching the end of trough section 40 overflows therefrom into the inlet end of trough section 66 through an overflow pipe 84 controlled by the valve 86. Most of the material from section 40 overflows into section 66 through this pipe. Another pipe 88, controlled by a valve 90, extends from the bottom of section 40 into the upper part of section 66 to allow drainage of material from the former and to prevent sediment, such as cereal particles, from accumulating therein.

The trough section 66 and the heating means therein are utilized to effect the active gelatinization, liquefaction and conversion of starch in the mixture flowing through this section after delivery from the preheating section 40. The temperature regulator 78 is set at a predetermined point so that the mixture, when it reaches the location of bulb 80, will have a temperature not departing substantially from a predetermined value. The introduction of steam into the mixture lengthwise of section 66 causes a progressive increase in the temperature of the mixture from the right-hand to the left-hand end of section 66. In this way, the preheated mixture entering the right-hand end from section 44 is gradually and progressively heated through a range of temperatures causing gelatinizing, liquefaction and conversion of the starch ingredient, and the retention period of the mixture in section 66 is so controlled that conversion or hydrolysis of the starch will have been substantially completed before the mixture reaches the baffle 70. The final temperature attained at this end of the trough section 80 may be such that the material entering the next stage of the process will be completely sterile.

The converted material from section 66 flows beneath baffle 70 into section 68, where it is enriched with sucrose and other desirable constituents by the addition of molasses through a molasses supply pipe 91. A meter 92 on pipe 91 indicates the rate of molasses addition. A valve 94 controls the rate of flow. Molasses is forced through pipe 91 from pipe 96 by means of a pump 98. It will be evident that the paddle arms 64 in trough section 68 effect a thorough mixing of the stream of converted material issuing from section 66 with the stream of molasses introduced through pipe 91.

After the molasses has been combined with the converted material at 68, the resulting mixture overflows into a tank 100 through a pipe 102, controlled by valve 104; or, the resulting mixture or sediment settled therefrom may be drained into tank 100 through a drain pipe 106, controlled by valve 108. Tank 100 is equipped with means for maintaining a constant level of liquid therein. For example, a float 110 is located in the tank so as to control a valve 112 in a discharge pipe 114. One end of pipe 114 is connected with the bottom of tank 100 through a pump 116. Another end of pipe 114 enters the jacket 120 of a continuous cooling system through which extends a cooling pipe 122. When the level of liquid in tank 100 exceeds a predetermined amount, valve 112 is opened and liquid is pumped from the tank into and through jacket 120. During its passage through this jacket, the liquid is reduced in temperature by the circulation of cool water through pipe 122. The effluent from pipe 122, having been warmed by heat exchange with the liquid in jacket 120, passes away through overflow pipe 29 and is available for mixture with the initial water supply for tank 22, as hereinabove described.

From the cooling jacket 120 cooled liquid passes into either one or another of a plurality of culturing vats 130 and 132. A pipe 34 leading from jacket 120 is provided with valved branches extending to the respective culturing vats. A thermometer 136 indicates the temperature of the cooled liquid entering the vats. Upon completion of the fermentation in vats 130 or 132, the resulting product may be discharged through a pipe 140 by means of a pump 142.

The following example illustrates the use of the above-described process and apparatus for the manufacture of a liquid base material for food products:

A mixture of solid starting ingredients is provided in hopper 10 containing, say, 65% of wheat starch or other starch material having a low gelatinizing temperature, 15% of powdered milk, 10% of soy bean meal, 5% of malt flour and 1% of common salt. A supply of water is provided in tank 22 at a temperature preferably not less than 13° C. and not higher than 28° C.

At the outset of operations the troughs 30 and 60 are preferably filled with water. The apparatus is then started in operation, and streams of the solid ingredients and water, respectively, are introduced at regulated rates into the first trough section 18. The proportion of water to dry ingredients under average conditions is about 1 gallon (8 pounds) of water to 5 pounds of dry ingredient. This proportion may be varied according to the concentrations desired.

The rate of rotation of shafts 32 and 62 is determined and controlled in relation to the rate of introducing dry ingredients and water into section 18, so as to maintain the desired rate of flow of material through the system. For example, shaft 32 may be rotated at a speed of about 150 R. P. M., and shaft 62 may be rotated at a speed of about 100 R. P. M.

The dry ingredients and water entering trough section 18 are thoroughly mixed together in this section by the action of the paddles 34 therein. From section 18 the mixture travels beneath baffle 42 into section 40, and during its travel through section 40 steam is introduced into and mixed with the mixture so as progressively to increase its temperature substantially to the disruption temperature of the starch. When using a mixture of the type indicated above, the temperature regulator 48 is set to keep the end temperature in section 40 at about 60 to 61° C.

The mixture flows continuously from section 40 into trough section 66, and in the latter steam is introduced at such a rate, controlled by the temperature regulator 78, that the temperature of the mixture is progressively increased to a final point of about 80 to 82° C. or more. There is consequently maintained in trough section 66 an increasing temperature gradient covering the range of temperatures from about 60° C. to about 82° C. Disruption of the starch component of the mixture takes place soon after the mixture has been introduced into trough section 66, and disruption and gelatinization of the starch are followed immediately by liquefaction and conversion thereof. Liquefaction becomes more pronounced at about 70° C., usually in a zone beyond the middle of section 66, which probably is attributable to substantially complete conversion having been attained. When the mixture reaches the left-hand end of trough section 66 it has attained the final temperature of 80 to 82° C. or more, and liquefaction and conversion of most of the starch have been completed. By the time this final temperature is reached sterilization of the liquid is effected and the diastatic enzymes in the mixture become dormant, but not before having accomplished their purpose.

The converted material passes from trough section 66 beneath baffle 70 and into trough section 68, where molasses is added continuously at a rate equivalent to about 10 to 30%, by weight, of the converted material, preferably about 20%. After the molasses has been incorporated the liquid over-flows into tank 100, where a substantially constant supply thereof is maintained. From tank 100 accumulating liquid is pumped through the cooling coil or jacket 120, and during its passage through this coil cool water is pumped through pipe 122 at such a temperature and such a rate that the cooled liquid will leave the coil, for example, at a temperature of about 30° C. At this point the liquid should have a pH of not more than 7 and a density of about 20 to 24° Baumé.

The cooled nutrient liquid from coil 120 passes into one of the culturing vats 130 and 132, where it is inoculated with a strong culture of seed yeast, preferably equivalent to about 1% of liquid yeast or about ½% of compressed yeast (S. cerevisiae). That is to say, 1000 gallons of nutrient liquid takes about 10 pounds of liquid yeast or about 5 pounds of compressed yeast. At the time of the yeast inoculation, or a few hours later, the same nutrient liquid is inoculated with a 48-hour milk culture of any of the lactic acid organisms used for food, such as B. acidophilus, B. bulgaricus, etc. One quart of milk culture per 1000 gallons of nutrient solution is sufficient. The amounts of yeast and lactic acid organism culture, of course, can be varied according to the type of fermentation desired.

After about 12 hours of culturing, portions of the culture in this first vat may be used to inoculate one or more additional vats of the nutrient liquid, using about 20 to 30% of the culture to each vat. After about 12 hours, portions of the cultures in vats so inoculated may in turn be used to start other vats. This process may be repeated as long as the culture appears vigorous and free from excess contamination. If desired, however, each vat may be started with a pure culture as in the first instance.

To stimulate the development of yeast to the fullest extent aeration should be instituted about 2 to 12 hours after inoculation and should proceed for about 8 hours. Any method of aeration known to be effective can be used, and the amount of air or other gases, as well as the period of aeration, can be varied to suit different requirements. If the culture is vigorously aerated the resulting liquid base material will have a higher yeast content, a lower sugar content and a lower density (about 9° Bé. or lower). With moderate aeration the density will be about 15 or 16° Bé., and the product will have a higher content of lactic acid and lactic acid organisms. This latter condition is desirable when a greater preservative action is desired in the final food, and also if it is desired that the therapeutic value of the food be increased by the presence of higher concentrations of lactic acid and lactic acid organisms. This latter condition is also desirable when foods made with the liquid base material are to be molded or pelleted, the liquid base material in such cases acting as an adhesive. On the other hand, it is sometimes desirable that the liquid base material contain a higher content of yeast, especially when it is to be used in foods of a semi-solid nature, and under such conditions a greater amount of aeration is employed during the fermentation.

The nutrient liquid in each vat is usually cultured for a total period of 48 hours or more to allow lactic acid organisms to develop and to build up a sufficient amount of lactic acid. The lactic acid, together with the sugars remaining in the product, acts as a carrier and a preservative for the various beneficial constituents developed in the course of the process, such as yeast, enzymes, vitamin B, complex vitamin G, lactic acid organisms and other beneficial end products that may be developed. When the culturing has been completed a finished liquid base material is obtained which is ready to be incorporated with any desired solid food or meal to produce composite food products which are particularly valuable as animal feeds, for poultry, fur-bearing animals, and other stock.

The incorporation of the liquid base with the meal food is usually carried out by means of a high speed mixer. The proportion of liquid base to be used varies in accordance with the character of the food, temperature and humidity conditions, and the amount of cohesiveness desired. For instance, by adding about 3 to 7% of the liquid base to a powdery mash or meal, a granular product is obtained. This results from the fact that the powder is bonded into granules by the syrupy base material. For pelleting or molding, some meals require more of the base material than others; for example, a fine powdery meal may require about 3% of the base material to produce firm, cohesive pellets, while a bulky feed may require as much as 7 to 9%. In preparing certain therapeutic products for use in controlling poultry diseases, the meals may be incorporated with as much as 15 to 20% of the liquid base material. Other valuable feeds of a semi-solid nature can be prepared by using as much as 75% of the liquid base material with as little as 25% of meal. When combined with silage, about 2 to 5% of the base material is usually employed.

After some composite foods have been prepared by the use of the special base material, it may be desirable to remove part of any excess moisture by passing the food through low temperature driers. Absolute dryness, however, is not necessary or desirable since the sugars in the presence of moisture tend to preserve the food and to act as conveyors for enzymes, vitamins, beneficial organisms, and other end products which are important to the quality of the food and to easy digestion thereof. Furthermore, when the base material is incorporated with the meal or other solid food its biochemical properties continue to act within such meal or food in the presence of moisture. For instance, starch may be further converted to digestible sugars, yeast cells and lactic organisms may be increased, and various other beneficial properties may be developed.

While numerous details relating to a specific embodiment of my invention have been described hereinabove, it will be understood that my invention is not restricted to these details of the illustrative embodiment but that it extends also to various other embodiments utilizing its novel features, as set forth in the appended claims. Some of the new features of my invention may be employed to advantage not only for the production of a liquid base material for composite food products, but also for the practice of various starch conversion processes in the food and allied industries. I therefore desire that my invention be accorded a scope fully commensurate with its novel contribution to the art, as limited only by the fair requirements of the appended claims.

I claim:

1. In a biochemical process in which starch is converted into sugar, the steps which comprise forming a mixture containing diastatic enzymes, water and starch having a low cell disruption temperature and heating said mixture progressively to such temperatures and for such a time that the starch is disrupted, liquefied and converted before the point of thermal inactivation of said enzymes is attained.

2. In a biochemical process in which starch in a starting material is disrupted and converted into sugar, the step which comprises effecting disruption and conversion of the starch in a single course of treatment by heating the same, in admixture with water and diastatic enzymes and in the presence of accelerating amino acids such as contained in powdered skim milk and soy bean meal, to temperatures above the cell disruption temperature of the starch, and controlling the temperatures and time of the heating so that said enzymes remain active while the starch is being disrupted and converted.

3. A process for converting starch into sugar which comprises forming a mixture containing water, starch having a low cell disruption temperature, diastatic enzymes and an agent which accelerates the hydrolysis of starch, and heating said mixture at temperatures above said cell disruption temperature for such a time that the starch is gelatinized and converted into dextrose before the thermal inactivation point of said enzymes is attained.

4. The process of claim 3, and continuing the heating of said mixture, after the starch has been converted, at such temperatures and for such a time that the mixture is rendered sterile.

5. The process of claim 3, said accelerating agent comprising amino acids such as contained in powdered skim milk and soy bean meal.

6. In the manufacture of a liquid food material, the steps which comprise providing a mixture of solid ingredients composed largely of starch and containing diastatic enzymes and amino acids which accelerate the hydrolysis of starch, combining said mixture with water in predetermined proportions to form a wet mass of high starch concentration, stirring the mass and gradually heating the same for such a time and to such temperatures above the cell-disruption temperature of said starch that the mass becomes sterilized, and controlling the rate of said heating at temperatures above said cell-disruption temperature so that starch is disrupted and converted into dextrose before said enzymes become inactive.

7. A process as described in claim 6, said controlled heating being carried out so as to increase the temperature of the mass about 1 to 3 degrees centigrade per minute.

8. The process for manufacturing a liquid base for food products which comprises forming a mixture with water of solid materials composed largely of starch and containing diastatic enzymes and starch-hydrolysis accelerating agents, stirring the mixture and gradually heating the same in a predetermined range of temperatures above the disruption temperature of said starch for a predetermined time sufficient to disrupt, liquefy and hydrolyze said starch while said enzymes remain active, enriching the liquefied mass with sucrose, then cooling the same and thereafter culturing the same with yeast and lactic acid organisms until sucrose has been inverted and the desired lactic acid content and physical consistency have been attained.

9. In a process for manufacturing a liquid food material from starting material composed largely of starch, the steps which comprise continuously mixing in predetermined proportions a stream of water and a stream of starting material composed largely of starch having a low disruption temperature and containing diastatic enzymes and starch-hydrolysis accelerating agents, stirring the resulting mixture while advancing the same continuously through a predetermined path, progressively increasing the temperature of the mixture in a portion of said path to approximately the disruption temperature of the starch, progressively increasing the temperature of the mixture in a further portion of said path to a final temperature substantially above said disruption temperature, flowing the mixture through said further portion at a predetermined rate sufficient to cause disruption and complete hydrolysis of starch before inactivation of said enzymes, and continuously discharging from said further portion a liquid material the dry substance of which is composed principally of sugars.

10. In a process for manufacturing a liquid base material for food products from starting material composed largely of starch, the steps which comprise continuously mixing in predetermined proportions a stream of water and a stream of starting material composed largely of starch having a low cell-disruption temperature and containing diastatic enzymes and amino acids which accelerate starch hydrolysis, stirring the mixture while advancing the same continuously through a predetermined path, progressively increasing the temperature of the mixture along said path to a final temperature substantially above the cell-disruption temperature of the starch, increasing the temperature of the mixture from said cell-disruption temperature to said final temperature at a predetermined rate sufficient to cause disruption, liquefaction and hydrolysis of said starch without destroying said enzymes and maintaining the mixture near said final temperature for a time sufficient to sterilize the same.

11. In a process for manufacturing a liquid base material for food products from starting material composed largely of starch, the steps which comprise continuously mixing in predetermined proportions a stream of water and a stream of starting material composed largely of starch having a low cell-disruption temperature and containing diastatic enzymes and amino acids which accelerate starch hydrolysis, stirring the mixture while advancing the same continuously through a predetermined path, progressively increasing the temperature of the mixture along said path to a final temperature substantially above the cell-disruption temperature of the starch, increasing the temperature of the mixture from said cell-disruption temperature to said final temperature at a predetermined rate sufficient to cause disruption, liquefaction and hydrolysis of said starch without destroying said enzymes, continuously enriching the liquefied material with sucrose-bearing material, continuously cooling the enriched material, and thereafter culturing the same with yeast and lactic acid organisms until sucrose has been inverted and the desired lactic acid content and physical consistency have been attained.

12. In a biochemical process for manufacturing a liquid base material for food products containing substantial concentrations of vitamin $B_1$, vitamin G, yeast, enzymes, lactic acid, lactic acid organisms and simple sugars, the steps which comprise mixing water with a starting material composed largely of wheat starch and containing diastatic enzymes, powdered skim milk and soy bean meal, progressively heating the mixture, while stirring, to a final temperature well above 60° C., and heating the mixture gradually in the range between about 60° C. and said final temperature at a rate causing gelatinization, liquefaction and conversion of said starch before inactivation of said enzymes.

13. In a biochemical process for manufacturing a liquid base material for food products containing substantial concentrations of vitamin $B_1$, vitamin G, yeast, enzymes, lactic acid, lactic acid organisms and simple sugars, the steps which comprise mixing from 1 to 2 parts, by weight, of water with 1 part of a starting material composed largely of wheat starch and containing small proportions of malt flour, powdered milk and soy bean meal, progressively heating the mixture, while stirring, to a final temperature of at least about 80° C., and effecting said heating in the range between about 60° C. and about 80° C. at a rate of about 1 to 3 degrees centigrade increase in temperature per minute thereby causing almost simultaneous gelatinization, liquefaction and conversion of said starch.

14. A biochemical process for manufacturing a liquid base material for food products containing substantial concentrations of vitamin $B_1$, vitamin G, yeast, enzymes, lactic acid, lactic acid organisms and simple sugars, which comprises mixing from 1 to 2 parts, by weight, of water with 1 part of a starting material composed largely of wheat starch and containing about 7 to 10% of malt flour, about 5 to 20% of powdered milk and about 5 to 15% of soy bean meal, progressively heating the mixture, while stirring, to a final temperature of at least about 80° C., effecting said heating in the range between about 60° C. and about 80° C. at a rate of about 1 to 3 degrees centigrade increase in temperature per minute, thereby causing almost simultaneous gelatinization, liquefaction and conversion of said starch, thereafter adding about 10 to 30% of molasses to the converted material, based on the weight of the latter, then cooling the material to a temperature below 35° C., and thereafter inoculating the cooled material with yeast, inoculating the same with a milk culture of lactic acid bacilli, culturing the inoculated material for a period in excess of 36 hours and aerating the same during a part of said period.

15. A biochemical process for manufacturing a liquid-base material for food products containing substantial concentrations of vitamin $B_1$, vitamin G, yeast, enzymes, lactic acid, lactic acid organisms and simple sugars, which comprises providing a supply of water at a temperature not exceeding 28° C., providing a supply of starting material composed largely of wheat starch and containing about 7 to 10% of malt flour, about 5 to 20% of powdered milk and about 5 to 15% of soy bean meal, continuously combining streams of said water and said starting material and mixing the same together in a proportion of about 1 to 2 parts, by weight, of water to 1 part of solid material, stirring the mixture and advancing the same in a continuous stream through a predetermined path, progressively increasing the temperature of the mixture along said path to a final temperature of at least about 80° C., effecting said heating in the range between about 60° C., and about 80° C. at a rate of about 1 to 3 degrees centigrade increase in temperature per minute so as to cause almost simultaneous gelatinization, liquefaction and conversion of said starch, continuously flowing the converted material through an enrichment zone and thereafter through a cooling zone, continuously adding about 10 to 30% of molasses to the mixture in the enrichment zone, cooling the enriched material to a temperature below 35° C. in said cooling zone, continuously discharging cooled material from said cooling zone into vats, and thereafter fermenting batches of the material with yeast and lactic acid bacilli in said vats.

16. The method of simultaneously gelatinizing and hydrolyzing starch which comprises forming a mixture containing water, starch having a low gelatinizing temperature, diastatic enzymes and amino acids which accelerate the hydrolysis of starch and heating a continuous stream of said mixture progressively, while stirring the same, until said enzymes have been rendered inactive and the sterilization point of the mixture has been attained, said heating from the gelatinizing temperature of said starch to said sterilization point being effected at a rate of about 1 to 3 degrees centrigrade increase in temperature per minute.

17. Apparatus for starch conversion and the like comprising a hopper to hold material composed largely of starch and containing diastatic enzymes, a water supply tank, mixing trough means, means for conducting streams of said material and water from said hopper and said tank respectively into said trough means, means for regulating the size of the respective streams, means in said trough means for continuously mixing said streams and conveying the resulting mixture through a predetermined path, means for heating the mixture in at least a portion of said path and control means responsive to the temperature of the mixture at a point in said path for controlling the temperature imparted by said heating means whereby to cause continuous disruption and conversion of the starch while said enzymes remain active.

18. Apparatus as described in claim 17, said trough means comprising interconnected mixing, preheating and conversion sections, mixing and conveying means in said sections for continuously advancing the mixture therethrough, means for heating the mixture in said preheating section, means for heating the mixture in said conversion section and temperature control means associated with said preheating and conversion sections, respectively, and responsive to the temperatures of the mixture therein for controlling the respective heating means.

19. Apparatus as described in claim 17, said trough means comprising interconnected mixing, preheating and conversion sections, means associated with said preheating and conversion sections for introducing steam into the mixture therein to increase progressively the temperature of the mixture during its passage through said path and control means for coordinating the rate of steam introduction with the rate of conveyance of said mixture whereby to control the temperature to which the mixture is heated.

20. A process which comprises continuously forming a non-liquid mixture of cereal starch with water in the presence of diastatic enzymes, continuously flowing the mixture through a heating zone, and gradually heating the mixture in the heating zone through a range of temperatures at which the enzymes remain active until the starch has become substantially fully gelatinized and converted into soluble sugars and a liquid culturing medium has been thus formed.

21. A process which comprises gradually heating starch in admixture with water and in the presence of enzymes of *Aspergillus oryzae* at such temperatures above the cell disruption temperature of the starch and for such a time that the starch is substantially fully disrupted, liquefied and converted before the point of thermal inactivation of said enzymes is attained.

GEORGE A. JEFFREYS.